Patented Aug. 23, 1932

1,873,300

UNITED STATES PATENT OFFICE

ALFRED DAVIDSON, WILLIAM WYNDHAM TATUM AND GORDON EDWARD WATTS, OF BLACKLEY, MANCHESTER, ENGLAND, ASSIGNORS TO IMPERIAL CHEMICAL INDUSTRIES LIMITED, OF LONDON, ENGLAND

MANUFACTURE OF SULPHONATED AMINO ANTHRAQUINONE

No Drawing. Application filed October 22, 1928, Serial No. 314,313, and in Great Britain May 30, 1928.

This invention relates to the manufacture of 1-amino-anthraquinone-2-sulphonic acid; and it comprises a method wherein this substance is made from a sulphate of alpha-aminoanthraquinone by heating under certain special conditions.

We have discovered a new and advantageous method of manufacturing 1-aminoanthraquinone-2-sulphonic acid. In developing our new process we have further discovered and established the conditions under which an almost quantative yield of animoanthraquinone sulphonic acid of good quality is obtained and under which the formation of polymolecular condensation products, for instance indanthrone, are practically totally suppressed. Our process may be so controlled as to establish and utilize such conditions to the best advantage.

It is known that by the action of acid condensing agents, including sulphuric acid, alpha-aminoanthraquinone is converted into indanthrone. (German Patents Nos. 186,636 and 186,637). It is therefore surprising that conditions could be discovered under which this indanthrone formation could be practically totally suppressed and under which an almost quantative yield of 1-aminoanthraquinone-2-sulphonic acid obtained.

Our present process comprises forming bisulphate of alpha aminoanthraquinone, that is, an acid sulphate and then converting such bisulphate into 1-aminoanthraquinone-2-sulphonic acid by heating the same at a temperature sufficient to affect the conversion but insufficient to form substantial amounts of polymolecular condensation products for a suitable time. The 1-aminoanthraquinone-2-sulphonic acid thus obtained may be recovered in a purified condition.

The reaction product produced by heat treatment after cooling may be treated with boiling water and the resulting solution filtered to remove residual amounts of insoluble matter. The 1-aminoanthraquinone-2-sulphonic acid may be recovered from the filtrate in a suitable manner. For instance, it may be recovered in the form of its sodium salt by salting the same from the filtrate by means of common salt.

To secure the best results and the highest yields the process should be carefully controlled especially in reference to the temperature at which the conversion is effected and to the ratio of the sulphuric acid to the aminoanthraquinone. We have found that the range of conditions within which a satisfactory yield of 1-aminoanthraquinone-2-sulphonic acid may be advantageously obtained, is quite narrow especially in the case of technical alpha-aminoanthraquinone. The temperature which we advantageously use lies between 210° C. and 240° C., and we have found that outside these limits, unless pure $\alpha$-aminoanthraquinone is used, only a poor yield of the sulphonic acid results. With pure $\alpha$-aminoanthraquinone a wider temperature range above 210° C. is permissible. The proportion of sulphuric acid, also, must be regulated to be not less than 1.0 molecule, nor more than 1.5 molecules for each molecule of aminoanthraquinone. It is advantageous but not essential to work at reduced pressure, or in a current of hot gas which will remove water vapour as formed.

The following examples, in which the parts are by weight, describe the preferred manner of manufacture according to our invention, but it will be understood that the conditions may be varied within the limits above defined, and any convenient method of working up the product may be employed.

*Example 1.*—(From purified $\alpha$-aminoanthraquinone)

223 parts of $\alpha$-aminoanthraquinone, purified by recrystallization from nitrobenzene, filtering the hot solution in order to remove inorganic matter, is stirred to a homogenous paste with 108 parts of sulphuric acid monohydrate and 100 parts of water. The paste is then dried at 100° C. with constant stirring. The resulting almost colourless powder consists of the bisulphate of α-aminoanthraquinone.

The sulphate is placed in a vacuum oven, so constructed that the powder may be spread in a thin layer, and heated to 240–245° C. for 3 hours. After cooling, the powder is boiled with 4000 parts of water, the solution filtered to remove a small amount of insoluble matter, and the filtrate salted with 400 parts of common salt. 1-aminoanthraquinone-2-sulphonate of sodium is thus obtained in orange-coloured needles. The yield is approximately 90 per cent of the theoretical.

*Example 2.*—(From crude α-aminoanthraquinone)

The preparation of the sulphate is carried out as in the previous example, but without purifying with nitrobenzene.

Crude α-aminoanthraquinone is found usually to contain inorganic catalysts which cause the formation of polymolecular condensation products of α-aminoanthraquinone if the temperature in the baking of the sulphate is carried too high. If on the other hand the temperature is too low a large proportion of the α-aminoanthraquinone is recovered unchanged. It is found, however, that if the temperature is maintained between 220–230° C. a yield of 75 per cent of the theoretical amount of 1-aminoanthraquinone-2-sulphonate of sodium may be obtained in the manner above described.

What we claim and desire to secure by Letters Patent is:—

1. In the manufacture of 1-aminoanthraquinone-2-sulphonic acid, the process which comprises forming an aqueous paste comprising a sulphate of alpha-aminoanthraquinone containing aminoanthraquinone and sulphuric acid in the molecular ratio 1 to 1.0-1.5, drying said paste to produce a powder, heating said powder to a temperature between 210–245° C. to convert the said sulphate into 1-aminoanthraquinone-2-sulphonic acid, boiling the reaction mass with water, filtering the solution thus produced to remove residual insoluble matter and recovering the purified aminoanthraquinone sulphonic acid.

2. The process of claim 1 in which the aminoanthraquinone sulphonic acid is recovered in the form of its sodium salt by salting the same from the filtrate.

3. In the manufacture of 1-aminoanthraquinone-2-sulphonic acid, the process which comprises forming the bisulphate of alpha-aminoanthraquinone by reacting together a purified alpha-aminoanthraquinone with sulphuric acid, heating said bisulphate at a temperature between 210 and 245° C. to convert said bisulphate into alpha-aminoanthraquinone sulphonic acid, boiling the reaction mass with water, filtering the solution thus produced to remove residual amounts of insoluble matter, salting the alpha-aminoanthraquinone sulphonic acid from said solution in the form of its sodium salt by means of sodium chloride, and isolating the sodium salt of the alpha-aminoanthraquinone sulphonic acid thus produced.

4. In the manufacture of 1-aminoanthraquinone-2-sulphonic acid from alpha-aminoanthraquinone, the process which comprises forming the bisulphate of alpha-aminoanthraquinone, heating said bisulphate of alpha-aminoanthraquinone to a temperature between 220 and 230° C. to convert the said bisulphate into 1-aminoanthraquinone-2-sulphonic acid by molecular rearrangement, boiling the reaction mass with water, filtering the solution thus produced to remove residual amounts of insoluble matter and recovering the purified aminoanthraquinone sulphonic acid.

5. In the manufacture of 1-aminoanthraquinone-2-sulphonic acid, the step which comprises converting a bisulphate of alpha-aminoanthraquinone prepared by reacting together sulphuric acid and a purified alpha-aminoanthraquinone, into 1-aminoanthraquinone-2-sulphonic acid by heating said bisulphate of alpha-aminoanthraquinone at a temperature between 210 and 245° C.

6. In the manufacture of 1-aminoanthraquinone-2-sulphonic acid, the step which comprises converting a sulphate of alpha-aminoanthraquinone containing alpha-aminoanthraquinone and sulphuric acid in the molecular ratio of 1 to 1.0–1.5 into 1-aminoanthraquinone-2-sulphonic acid by heating the said sulphate of alpha-aminoanthraquinone at a temperature between 220 and 230° C.

7. In the manufacture of 1-aminoanthraquinone-2-sulphonic acid, the step which comprises converting a sulphate of alpha-aminoanthraquinone containing aminoanthraquinone and sulphuric acid in the molecular ratio 1 to 1.0–1.5 into 1-aminoanthraquinone-2-sulphonic acid by heating the said sulphate of alpha-aminoanthraquinone under reduced pressure and at a temperature between 210 and 245° C.

8. In the manufacture of 1-aminoanthraquinone-2-sulphonic acid, the step which comprises converting a sulphate of alpha-aminoanthraquinone containing aminoanthraquinone and sulphuric acid in the molecular ratio 1 to 1.0–1.5 into 1-aminoanthraquinone-2-sulphonic acid by heating the said sulphate of alpha-aminoanthraquinone in a current of hot gas to remove water vapor as it is generated and at a temperature between 210 and 245° C.

9. In the manufacture of an aminoanthraquinone sulphonic acid from alpha-aminoanthraquinone, the process which comprises forming a sulphate of an aminoanthraquinone containing aminoanthraquinone and sulphuric acid in the molecular ratio of 1 to 1.0–1.5, converting the said sulphate into an aminoanthraquinone sulphonic acid by heating to a temperature between 210 and 245° C. and recovering the aminoanthraquinone sulphonic acid thus produced.

In testimony whereof we affix our signatures.

ALFRED DAVIDSON.
WILLIAM WYNDHAM TATUM.
GORDON EDWARD WATTS.